Patented Jan. 11, 1938

2,104,983

UNITED STATES PATENT OFFICE 2,104,983

AMMONOLYSIS OF HALOGENO-AROMATIC COMPOUNDS TO PRODUCE AMINES

Robert Frye, Chicago, Ill., assignor to The Sherwin-Williams Company, Cleveland, Ohio, a corporation of Ohio No Drawing. Application May 18, 1936, Serial No. 80,413

14 Claims. (Cl. 260—130.5)

The present invention relates to the preparation of aromatic amines by ammonolysis of halogen derivatives which normally react with ammonia to replace the halogen substituent by an amino group.

This reaction is commonly carried out on many halogen derivatives such as chloro and bromo derivatives of benzene, toluene, and their aromatic substituted derivatives, which compounds may also have other substituents in the nuclear ring. Exemplary compounds are chloro-benzene, di-chloro-benzenes, nitro-chloro-benzenes, dichloro-benzoyl-ortho-benzoic acids, chloro-toluenes, nitro-chloro toluenes, dibromo benzenes.

The fundamental reaction is one by which the halogen atom is replaced by an amino group through the intermediary of ammonia, forming hydrochloric acid, which of course is reactive at once with ammonia to form ammonium chloride. This reaction is old and forms no part of the present invention. However, one disadvantage of a process dependent upon this reaction is the occurrence of one or more side reactions wherein sectionary amines or other products are formed. These are such as to remain in the desired product as a contamination of the desired primary amine. It has been long recognized that the resulting primary amines are impure. In some instances the purity is of great concern, as for example in the manufacture of dyestuffs. When para-nitraniline is thus made from para-nitrochlor-benzene it gives a cloudy diazo solution in which the cloudiness is traceable to the secondary amine. Such impurities greatly affect the shades of dyestuffs. It is also well known that para-nitraniline made from aniline is more suitable for dyestuffs than that made by ammonolysis from para-nitro-chloro-benzene. By the present invention the ammonolysis can be so conducted as to yield a product equal to or better than that obtained by nitrating aniline.

It is therefore an object of the present invention to produce by ammonolysis a more pure primary amine; to minimize impurities produced by side reactions, and in the case of making para-nitraniline to minimize as an impurity any secondary amines; and in general to improve the ammonolysis process.

The present invention is based upon the discovery of means which successfully accomplishes the objects above set forth. It is not known exactly how the reaction is modified by the new means, and since the invention is here set forth specifically with respect to such means, the theory of its mechanism is unimportant.

It has been found that a small quantity of lead dioxide ($PbO_2$), also called lead peroxide, is very effective for the desired ends, and also that it may be used more effectively in combination with salts of weakly ionized acids, such as lead acetate, sodium acetate, sodium carbonate, and the like.

In order to illustrate the invention, the following example is given as a basis for further discussion and explanation.

Example I

*Preparation of para-nitraniline.*—100 parts of para-nitro-chloro-benzene, and 640 parts of 28% aqueous ammonia are placed in an autoclave as is customary in ordinary ammonolysis procedure. For practicing the present improvement in the process there is added 3 parts of lead dioxide, with or without 5 parts of sodium acetate. The autoclave is closed and slowly heated to 170° C. which temperature is maintained for about 12 hours.

The reaction mass is then transferred to a suitable vessel containing lime, and steam distilled to drive off ammonia. The vessel contents are cooled, and the resulting para-nitraniline is filtered off, washed and dried. The yield is 96.8% of theory. The product is essentially pure, and its diazonium salt solution is clear.

*Discussion.*—In the above example the time and temperature given are suitable for this particular ammonolysis procedure, and it is to be understood that these and other factors, such as the quantity and strength of ammonia, are subject to variation with the different halogenated bases employed as raw material. It may be stated that the general rule for ammonolysis is to use from 7 to 10 molecular equivalents of ammonia in excess of that required for the reaction, and to use a temperature in the range 165° C. to 180° C., yet temperatures as low as 150° C. and as high as 220° C. are known.

For the given quantity of para-nitro-chloro-benzene employed, the amount of lead dioxide may vary upwardly from about 1½ parts. The preferred quantity is 5 parts, but a quantity over this does not have any adverse action and may even improve the results. The preferred quantity appears to be an optimum concentration, when used without sodium acetate or its equivalent.

The sodium acetate is merely an example of a salt of a weakly ionized acid, the presence of which improves the efficiency of the lead dioxide employed. It does not appear to be a substitute for the lead dioxide, but is an auxiliary agent to it. In an example given, a quantity below 5 parts of sodium acetate does not exhibit much beneficial action, and a quantity above 10 parts shows little more benefit than is shown by 10 parts.

In varying the above example it is therefore possible to use lower quantities of the lead dioxide when there is present from 5 to 10 parts of sodium acetate or its equivalent. This is illustrated in the example wherein 3 parts of lead dioxide is used rather than the optimum 5 parts previously referred to when sodium acetate is not used.

The effectiveness of the sodium acetate or its equivalent is believed to be due to its action in minimizing the effect of hydrolysis of ammonium chloride, which produces normally an active quantity of hydrochloric acid. The sodium acetate or its equivalent can convert at least some of this free highly ionized acidity into less active acetic acid, which is weaker than hydrochloric acid. This explanation, while only a theory, is in line with some beliefs that hydrochloric acid is responsible in part at least for the formation of secondary amines. It is also in conformity with the successful operation of other salts of weakly ionized acids as auxiliary agents for the specific action of lead dioxide.

The above discussion of quantities of lead peroxide and of sodium acetate is given with reference to the preparation of para-nitraniline. It is to be understood that these optimum and limiting quantities may vary for another ammonolysis process, and that it is only within the field of experimentation for anyone skilled in the art to determine a suitable, limiting, or optimum concentration for the primary agent or its auxiliary agent. Therefore, the concentrations are not critical limitations broadly for the invention. Although the above example is given specifically with reference to use of para-nitro-chlor-benzene, it is to be understood that usually some ortho isomer is also present in the commercial para isomer, and that mixtures of the ortho and para isomers are frequently treated by ammonolysis, resulting in ortho and para nitranilines. The present invention has been applied in such cases, as with other mixed isomeric halogen aromatic derivatives.

When the ammonolysis of the above example is carried out without using the present invention it has been ascertained that there is about 0.3% of para-para dinitro-diphenyl amine formed. This is sufficient to form a cloudy diazonium salt solution. Since the cloudiness is not observed in a product of this invention, it is obvious that this secondary amine is largely absent. It is not herein claimed that it is not formed, for it may be formed and effectively destroyed.

Although the invention is illustrated by use of lead peroxide as $PbO_2$, is to be understood that another higher oxide of lead, such as $Pb_3O_4$, may be used, because it acts as if it contains $PbO_2$ in its make-up. Such higher oxides of lead contain available oxygen which is effective in the process to set free chlorine. The free chlorine is not in an ionic state, and therefore the new agent is effective to reduce the concentration of chlorine ions in the reacting mass. The fact that only a small amount of such oxide has a maximum effect, is indicative of the fact that there are limitations to the extent of the reactions in which the new agent is involved, and only small amounts of free chlorine are observed in the final reaction mass.

The same nature of beneficial improvements is to be observed in other ammonolysis reactions, and therefore the invention is not to be considered as limited to the specific example herein disclosed. The improvement is one generally for ammonolysis reactions as set forth in the appended claims.

I claim:

1. The process which comprises treating a halogen substituted benzene nucleus with aqueous ammonia in an autoclave at a temperature within the range from 150° C. to 220° C., whereby to form a primary amine, in the presence of lead dioxide.

2. The process which comprises treating a halogen substituted benzene nucleus with aqueous ammonia in an autoclave at a temperature within the range from 150° C. to 220° C., whereby to form a primary amine, in the presence of lead dioxide and a salt of a weakly ionized acid which is water-soluble in the autoclave under the conditions of reaction.

3. The process which comprises treating a halogen substituted benzene nucleus with aqueous ammonia in an autoclave at a temperature within the range from 150° C. to 220° C., whereby to form a primary amine, in the presence of lead dioxide and sodium acetate.

4. The process which comprises treating a chlorine substituted benzene nucleus with aqueous ammonia in an autoclave at a temperature within the range from 150° C. to 220° C., whereby to form an amine, in the presence of lead dioxide.

5. The process which comprises treating a chlorine substituted benzene nucleus with aqueous ammonia in an autoclave at a temperature within the range from 150° C. to 220° C., whereby to form an amine, in the presence of lead dioxide and a salt of a weakly ionized acid which is water-soluble in the autoclave under the conditions of reaction.

6. The process which comprises treating a chlorine substituted benzene nucleus with aqueous ammonia in an autoclave at a temperature within the range from 150° C. to 220° C., whereby to form an amine, in the presence of lead dioxide and sodium acetate.

7. The process of preparing nitraniline which comprises treating nitro-chloro-benzene with aqueous ammonia in an autoclave at a temperature within the range from 150° C. to 220° C. whereby to form nitraniline in the presence of lead dioxide.

8. The process of preparing nitraniline which comprises treating nitro-chloro-benzene with aqueous ammonia in an autoclave at a temperature within the range from 150° C. to 220° C. whereby to form nitraniline in the presence of lead dioxide and a salt of a weakly ionized acid which is water-soluble in the autoclave under the conditions of reaction.

9. The process of preparing nitraniline which comprises treating nitro-chloro-benzene with aqueous ammonia in an autoclave at a temperature within the range from 150° C. to 220° C. whereby to form nitraniline in the presence of lead dioxide and sodium acetate.

10. The method of preparing para-nitraniline which comprises treating 100 parts of para-nitro-chloro-benzene with excess aqueous ammonia in an autoclave at a temperature within the range from 150° C. to 220° C. whereby to form para-nitraniline, in the presence of at least 1½ parts of lead dioxide.

11. The method of preparing para-nitraniline which comprises treating 100 parts of para-nitro-chloro-benzene with excess aqueous ammonia in an autoclave at a temperature within the range from 150° C. to 220° C. whereby to form para-nitraniline, in the presence of at least 1½ parts of lead dioxide and a salt of a weakly ionized acid which is water-soluble in the autoclave under the conditions of reaction.

12. The method of preparing para-nitraniline which comprises treating 100 parts of para-nitro-chloro-benzene with excess aqueous ammonia in an autoclave at a temperature within the range from 150° C. to 220° C. whereby to form para-nitraniline, in the presence of at least 1½ parts of lead dioxide and from 5 to 10 parts of sodium acetate.

13. The process which comprises treating a halogen substituted benzene nucleus with aqueous ammonia in an autoclave at a temperature within the range from 150° C. to 220° C., whereby to form a primary amine, in the presence of an oxide of lead with valence of 4.

14. The process which comprises treating a halogen substituted benzene nucleus with aqueous ammonia in an autoclave at a temperature within the range from 150° C. to 220° C., whereby to form a primary amine, in the presence of an oxide of lead with valence of 4 and a salt of a weakly ionized acid which is water-soluble in the autoclave under the conditions of reaction.

ROBERT FRYE.